United States Patent
Albanes et al.

(10) Patent No.: US 11,606,466 B2
(45) Date of Patent: *Mar. 14, 2023

(54) METHOD AND APPARATUS FOR DISTRIBUTING CONTENT VIA A WIRELESS COMMUNICATION NETWORK

(71) Applicant: AT&T Mobility II LLC, Atlanta, GA (US)

(72) Inventors: Stalin Albanes, Atlanta, GA (US); Allenn Han, Atlanta, GA (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,411

(22) Filed: Jun. 16, 2021

(65) Prior Publication Data

US 2021/0314445 A1 Oct. 7, 2021

Related U.S. Application Data

(63) Continuation of application No. 16/401,946, filed on May 2, 2019, which is a continuation of application
(Continued)

(51) Int. Cl.
*H04M 15/00* (2006.01)
*H04L 12/14* (2006.01)
*H04W 4/24* (2018.01)

(52) U.S. Cl.
CPC ............ *H04M 15/61* (2013.01); *H04L 12/14* (2013.01); *H04L 12/1407* (2013.01);
(Continued)

(58) Field of Classification Search
None
See application file for complete search history.

(56) References Cited

U.S. PATENT DOCUMENTS

| 7,372,850 B1 | 5/2008 | Chen et al. |
| 7,720,102 B1 | 5/2010 | Chow et al. |

(Continued)

FOREIGN PATENT DOCUMENTS

| WO | 2015057194 | 4/2015 |
| WO | 2015057194 A1 | 4/2015 |

*Primary Examiner* — Hong Shao
(74) *Attorney, Agent, or Firm* — Guntin & Gust, PLC

(57) ABSTRACT

Aspects of the subject disclosure may include, for example, a method including detecting, by a processing system comprising a processor, wireless communication servers that are available for providing content via first wireless communication links to a wireless communication system, receiving unused data capacity information from the wireless communication servers, aggregating comprising a processor, the unused data capacity information from the wireless communication servers to identify broadband bandwidth, receiving, by the processing system, a request for first content from a customer premises device, assigning a first portion of the broadband bandwidth for receiving the first content from the wireless communication servers, requesting the first content from the wireless communication servers according to the assigning, receiving the first content from the wireless communication servers, and transmitting the first content to the customer premises device. Other embodiments are disclosed.

20 Claims, 8 Drawing Sheets

Related U.S. Application Data

No. 15/188,306, filed on Jun. 21, 2016, now Pat. No. 10,326,889.

(52) U.S. Cl.
CPC .......... *H04M 15/57* (2013.01); *H04M 15/66* (2013.01); *H04W 4/24* (2013.01)

(56) References Cited

U.S. PATENT DOCUMENTS

| | | |
|---|---|---|
| 8,380,184 B2 | 2/2013 | Kamdar et al. |
| 8,381,250 B2 | 2/2013 | Tjio et al. |
| 8,811,152 B2 | 8/2014 | Fan et al. |
| 9,077,649 B2 | 7/2015 | Kotecha et al. |
| 2008/0175232 A1 | 7/2008 | Tsai et al. |
| 2010/0094967 A1 | 4/2010 | Zuckerman et al. |
| 2012/0300789 A1 | 11/2012 | Sniezko et al. |
| 2014/0092828 A1 | 4/2014 | Sirotkin et al. |
| 2015/0215816 A1 | 7/2015 | Abou-Elkheir et al. |
| 2015/0229584 A1 | 8/2015 | Okamoto et al. |
| 2017/0367094 A1 | 12/2017 | Albanes |
| 2019/0260880 A1 | 8/2019 | Albanes et al. |

METHOD AND APPARATUS FOR DISTRIBUTING CONTENT VIA A WIRELESS COMMUNICATION NETWORK

CROSS REFERENCE TO RELATED APPLICATION(S)

This application claims priority to and is a continuation of U.S. patent application Ser. No. 16/401,946, filed on May 2, 2019, which is a continuation of U.S. patent application Ser. No. 15/188,306, filed on Jun. 21, 2016, now U.S. Pat. No. 10,326,889. All sections of the aforementioned application(s) and patent(s) are incorporated herein by reference in their entirety.

FIELD OF THE DISCLOSURE

The subject disclosure relates to a method and apparatus for distributing content via a wireless communication network.

BACKGROUND

Content, including media content, is typically experienced by consumers via devices such as computers, televisions, radios, and mobile electronics. Media content can be delivered by service providers, who send the content, such as television, radio, and video programming, to consumers for enjoyment at their physical locations. Modern communications networks benefit from interconnectivity between consumers and various communication devices. As network capabilities expand, these interconnections can provide new opportunities to enhance the ability for consumers to enjoy content by experiencing a variety of content over multiple devices. Intelligent devices offer means for the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
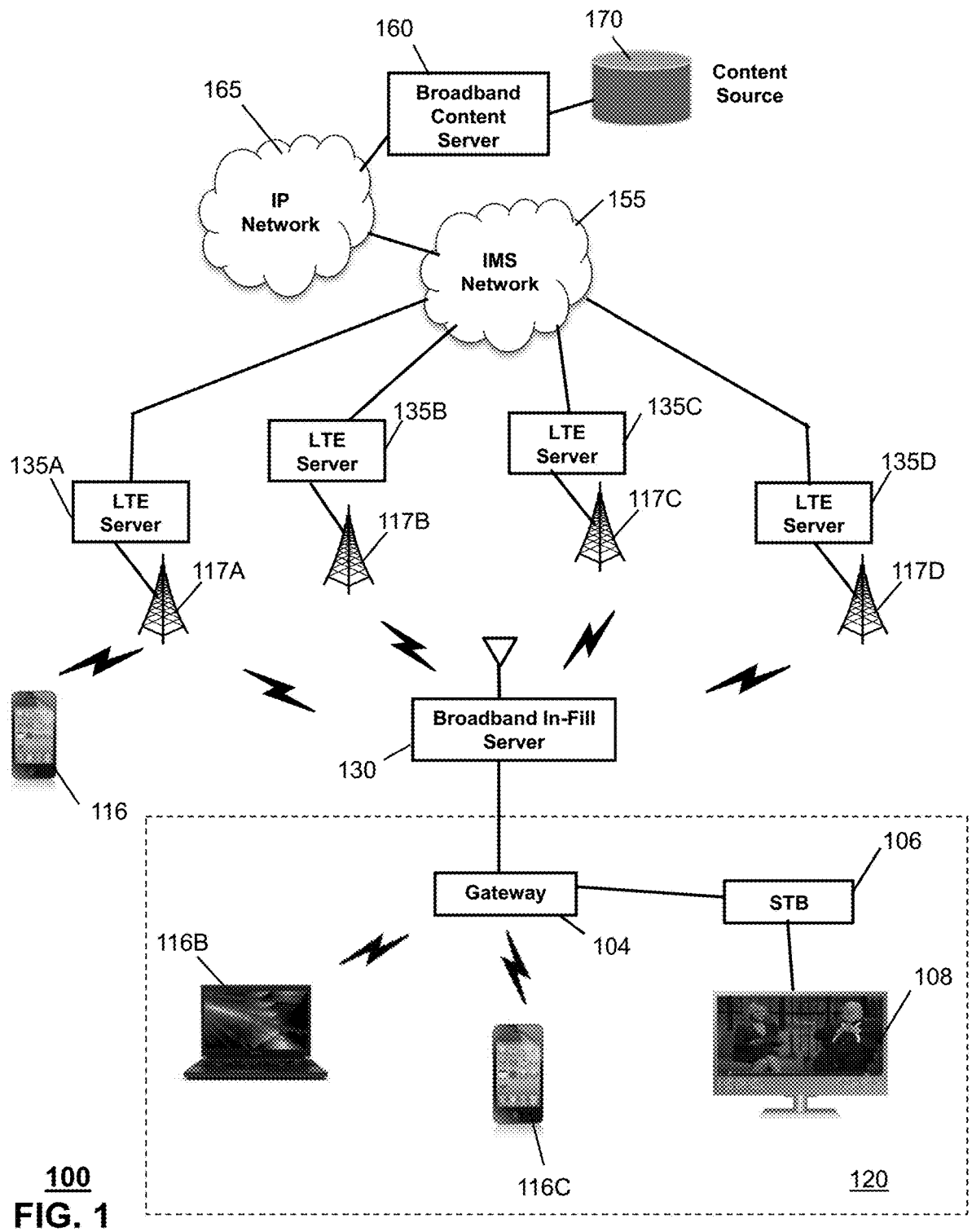
FIG. 1 depicts an illustrative embodiment of a system that can be utilized for providing content via a wireless communication network using a broadband in-fill server.

The subject disclosure describes, among other things, illustrative embodiments for providing content to customer premises devices using a wireless communication system. In one or more embodiments, a broadband in-fill server can detect wireless communication servers, such as long term evolution (LTE) servers, operating in the wireless communication system. The LTE servers are designed to provide mobile telephony and data access capabilities to mobile communication devices via a network of cellular base stations. The broadband in-fill server can establish wireless communications with multiple LTE servers via multiple cellular base stations in a geographic area. The broadband in-fill server can access information from the LTE servers to assess unused data capacity that is available on the LTE servers. The broadband in-fill server can then aggregate the unused data capacity to for a virtual aggregated data capacity for the group of LTE servers to which it is connected.

The broadband in-fill server can form wired and/or wireless communication links to customer premises equipment, such a residential gateway devices, which, in turn, can support local area networks (LAN) at customer premises. Devices at the customer premises, such as media processing devices (e.g., set-top boxes), computer devices, and/or mobile communication devices, can access the broadband in-fill server via the residential gateway. The broadband in-fill server request information about content that is available for download from the wireless communication system from the LTE servers and can provide information on available content to devices that are coupled to LANs connected to the broadband in-fill server. Devices can request content from the broadband in-fill server, which can assign portions of the aggregated data capacity to the downloading task. One or more of the LTE servers can participate in providing the content to the broadband in-fill server, which can receive the content and prepare it for transmission to the requesting device via the residential gateway device. Other embodiments are described in the subject disclosure.

One or more aspects of the subject disclosure include a server, including a processing system including a processor and a memory that stores executable instructions that, when executed by the processor, facilitate performance of operations, including detecting wireless communication servers of a wireless communication system that are available for providing content via first wireless communication links. The processing system can also perform operations including requesting unused data capacity information from the wireless communication servers, wherein the unused data capacity information is requested periodically, and, in turn, receiving the unused data capacity information from the wireless communication servers. The wireless communication servers can retain data capacity for providing content services to mobile devices subscribed to the wireless communication system. The processing system can also perform operations including aggregating the unused data capacity information from the wireless communication servers to identify broadband bandwidth. The processing system can further perform operations including receiving a request for first content from a customer premises device. The processing system can perform operations including assigning a first portion of the broadband bandwidth for receiving the first content from the wireless communication servers, wherein the assigning causes a mapping of segments of the first content for delivery by a second portion of the wireless communication servers according to the first portion of the aggregated data capacity. The processing system can also perform operations including requesting the segments of the first content from the second portion of the wireless communication servers according to the mapping, and, in turn, receiving the segments of the first content from the second portion of the wireless communication servers. The processing system can further perform operations including combining the segments of the first content that are received to recreate the first content, generating a first content stream from the first content, and, in turn, transmitting the first content stream to the customer premises device.

One or more aspects of the subject disclosure include a machine-readable storage medium, including executable instructions that, when executed by a processing system including a processor, facilitate performance of operations, including detecting content servers that are available for providing content via first wireless communication links to a wireless communication system. The operations can include receiving unused data capacity information from the wireless communication servers and aggregating the unused data capacity information from the wireless communication servers to identify broadband bandwidth. The operations can also include receiving a request for first content from a customer premises device. The operations can further include assigning a first portion of the broadband bandwidth for receiving the first content from the wireless communication servers, wherein the assigning causes a mapping of segments of the first content for delivery by a second portion of the wireless communication servers according to the first portion of the aggregated data capacity that is assigned. The operations can include requesting the segments of the first content from the second portions of the wireless communication servers according to the mapping and, in turn, receiving the segments of the first content from the second portion of the wireless communication servers. The operations can also include combining the segments of the first content that are received to recreate the first content, and, in turn, transmitting the first content to the customer premises device.

One or more aspects of the subject disclosure include a method, including detecting, by a processing system comprising a processor, wireless communication servers that are available for providing content via first wireless communication links to a wireless communication system. The method can include receiving, by the processing system, unused data capacity information from the wireless communication servers, and aggregating, by the processing system, the unused data capacity information from the wireless communication servers to identify broadband bandwidth. The method can include receiving, by the processing system, a request for first content from a customer premises device. The method can also include assigning, by the processing system, a first portion of the broadband bandwidth for receiving the first content from the wireless communication servers. The method can further include requesting, by the processing system, the first content from the wireless communication servers according to the assigning, and receiving, by the processing system, the first content from the wireless communication servers. The method can include transmitting, by the processing system, the first content to the customer premises device.

FIG. 1 depicts an illustrative embodiment of a system that can be utilized for distributing content to customer premises devices using a wireless communication network. In one embodiment, the system 100 can incorporate a subscription-based, mobile communication service as a wireless communication network. In this system 100, an internet protocol multimedia subsystem (IMS) network 155 can be used to route telecommunication services and/or data services for mobile communication devices 116, such as wireless smart phones, using cellular, long term evolution (LTE), third generation (3G), and/or fourth generation (4G) wireless networks. The system 100 can include a network of cellular base stations 117A-D that provide radio frequency (RF) communication links between wireless communication servers 135A-D and mobile communication devices 116. The mobile communication devices 116 can perform two-way telephonic communications, as well as two-way data communications, through the IMS network 155 by way of these RF communication links. The mobile communication devices 116 can access public internet protocol (IP) networks 165, which can, in turn, deliver content to the mobile communication devices 116 through the cellular base stations 117A-D.

In one or more embodiments, the wireless communication servers 135A-D can be based on LTE architecture and methods. For example, each LTE server 135A can include architectural and functional consistent with a 3GPP standard. These features/functions can include but are not limited to an LTE Radio Access Technology (RAT) network, an eNodeB interface, and/or a Mobile Packet Core (MPC), including a Mobility Management Entity (MME), a Home Subscriber Server (HSS), a Serving Gateway (S-GW), a PDN Gateway (P-GW), and/or a Policy Control Resource Function (PCRF). In one or more embodiments, an LTE RAT network or an LTE server 130 can be implemented as an LTE-Uu network, which can be implemented as an Evolved UMTS Terrestrial Radio Access Network (E-UTRAN), a Universal Mobile Telecommunications System (UMTS), a Global System for Communications (GSM) network, an Evolution Data Only (EVDO) network, and/or a Code Division Multiple Access (CDMA) network.

An LTE-Uu network can provide radio communication assets for wireless connectivity between mobile communication devices 116 and a Mobile Packet Core (MPC) of an LTE server 135A. In one embodiment, an LTE-Uu network can further be coupled to an eNodeB and can carry many traffic types including IP-based packet switched traffic. In one embodiment, an E-UTRAN-based LTE-Uu can include one or more eNodeB nodes on the network that are connected to one other via X2 interfaces and can be further connectable to an MPC network via an S1-U interface. For example, an E-UTRAN-based LTE-Uu 120 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, the LTE server 135A can include an eNodeB to perform operations consistent with a 3GPP standard. The eNodeB can provide an air interface to an LTE-Uu network and to network interfaces that link to the MPC. The air interface can support an E-UTRAN-based LTE-Uu network, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface can enable the eNodeB to receive requests for connection to the system 100 from various types of devices, including mobile communication devices 116.

In one or more embodiments, the eNodeB can request authentication for a mobile communication device 116. For example, the eNodeB 140 can forward a connection request to an MME of the MPC of the LTE server 135A. An authentication request can be completed as a control plan function for the connecting device 116. The authentication request can flow to the MME of the LTE server 135A via a Non-Access Stratum (NAS) protocol message, via a tunneling protocol (GTP) link between eNodeB and the MME. The MME can convert the request to an Internet Engineering Task Force (IETF) standard authentication message protocol, such as the Diamond protocol, which can be forwarded to a Home Subscription Service (HSS) server for verification of the authentication request for the mobile communication device 116. The MME 160 can handle conversion of the authentication request and interfacing for interrogating an HSS of the MPC via a tunneling protocol. In one embodiment, when a mobile communication device 116 or a broadband in-fill server 130 is booted up, an authentication request can be sent to an MME via an eNodeB.

In one or more embodiments consistent with the 3GPP standard, the LTE server 135A can include a Home Subscriber Server (HSS) that can be provide a central database that contains user-related and subscription-related information. The functions of the HSS include functionalities such as mobility management, call and session establishment support, user authentication and access authorization. In one embodiment, the HSS can manage subscription-related information in real time, for multi-access and multi-domain offerings in an all-IP environment. The HSS can be based on Home Location Register (HLR) and Authentication Center (AuC). Where the HSS 155 returns a successful authentication of the mobile communication device, an MME can perform additional control plane functions, such as assigning one or more bearer gateways for use in transporting user data to and from the mobile communication device 116. In one embodiment, a default bearer gateway can provide a default pathway for control and signal messages, while a dedicated bearer gateway can provide a pathway for critical signals, such as voice over internet (VoIP), where a guaranteed quality of service (QOS) must be provided. Hence, the MME can perform assignment, creation, deletion, and/or maintenance of bearer gateways.

In one or more embodiments consistent with the 3GPP standard, the LTE server 135A can include a Mobility Management Entity (MME). The MME can perform assignment of bearer gateways for a mobile communication device 116. The MME can further perform updates and handovers on behalf of the mobile communication device 116 as the mobile communication device 116 moves between various LTE-Uu wireless network locations, including various cellular base stations 135A-D. The MME 160 can assign initial bearer gateways for the mobile communication device 116 based on location information and QoS information associated with the mobile communication device 116. However, if the mobile communication device 116 moves to a different location, or if the mobile communication device 116 acquires a different QoS requirement, then the MME 160 can be required to update the assignment of the bearer gateways to fulfill performance requirements. Hence, the MME can assign and maintain bearer pathways for user data for the mobile communication device 116. In one or more embodiments, the eNodeB can support a tunneling protocol pathway for authentication, control plane, and user plane for a mobile communication device 116.

In one or more embodiments consistent with the 3GPP standard, the MME can perform functions such as idle mode tracking and paging procedure including retransmissions. The MME can also choose a serving gateway for the mobile communication device 116. The serving gateway can be chosen at an initial attach and/or at a time of intra-LTE handover involving node relocation. The MME can be accessed when an attempt is made to re-register to access a core network of the LTE server 135A. In one embodiment, after an eNodeB and an MME have established a tunneling link for a mobile communication device 116, the session can be maintained indefinitely.

In one or more embodiments according to the 3GPP standard, the LTE server 135A can include a Serving Gateway (S-GW), which can route and forward user data packets, while also acting as the mobility anchor for the user plane during inter-eNodeB handovers and as the anchor for mobility between the LTE server and other 3GPP technologies. For a mobile communication device 116 in idle state, the S-GW can terminate a downlink data path and can trigger paging when downlink data arrives. The S-GW can manage and store device contexts, such as parameters of an IP bearer service and/or network internal routing information.

In one or more embodiments consistent with the 3GPP standard, the LTE server 130 can include a PDN Gateway (P-GW) that can provide connectivity from the mobile communication device 116 and/or the broadband in-fill server 130 to external packet data networks, such as the IMS network 155, by being a point of exit and/or entry of traffic. The mobile communication device 116 can have simultaneous connectivity with more than one P-GW for accessing multiple PDNs. The P-GW can perform policy enforcement, packet filtering, charging support, lawful interception and/or packet screening. The P-GW can also act as an anchor for mobility between 3GPP and non-3GPP technologies such as WiMAX and 3GPP2 (CDMA 1× and EvDO).

In one or more embodiments consistent with the 3GPP standard, the LTE server 130 can include a Policy Control Resource Function (PCRF). The PCRF can be a software node designated in real-time to determine policy rules. As a policy tool, the PCRF can operate at the network core of the LTE server 135A and can access subscriber databases and other specialized functions, such as a charging system, in a centralized manner. The PCRF can aggregate information to and from the network, operational support systems, and other sources (such as portals) in real time, supporting the creation of rules and then automatically making policy decisions for each subscriber active on the network. The PCRF can provide a network agnostic solution (e.g., wire line and/or wireless) and can be integrated with different platforms like billing, rating, charging, and subscriber database or can also be deployed as a standalone entity. The functions performed by the PCRF can be any variety of functions, such as computer implemented steps in a process or algorithm associated with operation of a mobile communications network.

In one or more embodiments, the system 100 can provide content to mobile communication devices 116 via the network of cellular base stations 117A-D and the LTE servers 135A-D. For example, a subscription content service provide content can be any type, such as broadcast television, premium television, video on demand, and/or pay-per-per view television. The content can be software content, including entire software programs, upgrades to programs, and/or additions to programs. The content can be subscription-based content (e.g., premium television channels, streaming content services) and/or non-subscription-based (e.g., "free" over-the-air television content and/or single offers or purchases of content). In one embodiment, the system 100 can include one or more content servers 160 that can receive content from one or more content sources 170. Content servers 160 can provide content to one or more delivery networks 155 and 165. For example, a content server 130 can deliver media content services via an internet protocol multimedia subsystem network 155 and/or an internet protocol network 165.

The system 100 can further include authentication functions to insure that media content is distributed only to verified subscribers of the system 100, the networks 155 and 165 and/or the content server 160 according to service plan levels of those subscribers. For example, the system 100 can verify that a mobile communication device 116 is be properly identified and validated for receiving media content over the system 100. For example, one or more authentication servers can be used to verify the subscription status of the mobile communication device 116. Device identifying information, such as MAC address, IP address, and/or SIM card information, can be transmitted to an authentication server. An authentication server can use this identifying information from the media processor device 106 to inquire at a subscriber database of service plan information for a subscriber who is associated with the mobile communication device 116 6. The subscriber database can provide subscription status and service plan information to allow the authentication server to enable delivery of purchased media content to the mobile communication device 116. In one or more embodiments, the media content can be selected based on a number of techniques and criteria, such as based on user input, user preferences, user profiles, monitored user viewing history, and so forth.

In one or more embodiments, the system 100 can include a broadband in-fill server 130. The broadband in-fill server 130 can provide broadband service to premises 120. For example, traditional wired broadband and satellite services may be available in certain locations due to various reasons, such as absence of wired infrastructure, antiquated infrastructure, obstructions that prevent reception of satellite signals, and/or regulations that limit or prohibit the use of satellite reception equipment (e.g., condominiums, apartments, and/or certain home owner associations). While these situations may limit availability of wired and/or satellite broadband, the LTE-based communication system 100 of FIG. 1 can provide very comprehensive RF signal coverage to these same locations. The broadband in-fill server 130 can provide a means for premises 120 to access broadband content via a mobile communication system. The broadband in-fill server 130 can engage in wireless communication with one or more LTE servers 135A-D using one or more cellular base stations 117A-D.

In one or more embodiments, the broadband in-fill server 130 can detect RF signals from one or more of the cellular base stations 117A-D. The broadband in-fill server 130 can initiate connections to multiple LTE servers 135A-D with which it is receiving sufficiently strong RF signal power. For example, the broadband in-fill server 130 can open communication sessions with LTE servers 135A, 135B and 135D. The LTE servers 135A, B, and D can authenticate the broadband in-fill server 130, can register the broadband in-fill server 130 for communications, and can assign system resources, such as bearer paths, for use in providing data to the broadband in-fill server 130. In one embodiment, one or more of these LTE servers 135A, B, and D can be capable of providing broadband content to the broadband in-fill server 130 (as such broadband content could be provided to a mobile communication device 116).

In one or more embodiments, the broadband in-fill server 130 can request information from the LTE servers 135A, B, and D with which the broadband in-fill server 130 is in communication. In particular, the broadband in-fill server 130 can request information regarding unused data capacity for each of the LTE servers 135A, B, and D. Each LTE server 135A can have a maximum data capacity for providing content to all devices that are coupled thereto. For example, LTE server 135A can provide content to a number of client devices, including mobile communication devices 116 and the broadband in-fill server 130. At any moment an LTE server 135A can compare its maximum capability to the amount of data that it is currently delivering to client devices. A difference between the maximum data capacity and the current data loading represents an unused available capacity for the LTE server 135A. In one embodiment, a portion of the data capacity of an LTE server 135 can be subtracted from the maximum data capacity of the LTE server 135A so that LTE server 135A can always retain a margin of data capacity for servicing subscriber mobile communication devices 116.

In one or more embodiments, the broadband in-fill server 130 can request the unused capacity information for all of the LTE servers 135A, B, and D with which it is connected. The broadband in-fill server 130 can aggregate, or combine, the unused capacity from these LTE servers. The broadband in-fill server 130 can aggregate this unused radio capacity of multiple neighboring LTE servers 135A, B, and D and make the consolidated bandwidth available to the gateway device 104 for the distribution of multimedia hi-speed services, without significantly impacting mobile users sharing the same sites. Broadband bandwidth is identified by aggregating small amounts of data from multiple LTE servers 135A, B, and D so as to minimally impact the LTE network. In one embodiment, the broadband in-fill server 130 can request the unused capacity information from the attached LTE servers 135A, B, and D, on a periodic basis (e.g., every second) so that the broadband in-fill server 130 can maintain up to date broadband bandwidth.

In one or more embodiments, the broadband in-fill server 130 can be connected to a typical Residential Gateway 104 through wireline (e.g., coax, CAT cable), wireless (e.g., Wi-Fi, Bluetooth, IR, NFC) or other types of transmission. The gateway device 104 can function as an interface between the broadband in-fill server 130 and various devices at the premises, such as a computer device 116B, a mobile communication device 116C, a media processor device 106 (e.g., a set-top box), and a media device 108 (e.g., a television). In one embodiment, the gateway device 104A can provide broadband content, internet working functions, such as protocol translation, impedance matching, data rate conversion, and/or fault isolation necessary for exchanging data between broadband in-fill server 130 and the premises-based devices 116B, 116C, and 106. In one embodiment, the gateway device 104 can provide access to a public IP network 165 of the system 100. The public IP network 165 can facilitate communications to Internet-based applications, websites, and databases, such as Social Media sites and Web Databases. This connectivity can allow the premises-based devices 116B, 116C, and 106 in the system 100 to access and be accessed by the various Internet-based applications, websites, and/or databases.

In one or more embodiments, the LTE server 135A-D can provide information to client devices, such as the broadband in-fill server 130, regarding content that can be provided to these client devices through the LTE servers 135A-D. In one embodiment, all of the LTE servers 135A-D that can physically connect to the broadband in-fill server 130 at the same time can provide the same content to the broadband in-fill server 130. In another embodiment, one or more of the LTE servers 135A-D can provide differentiated content. The broadband in-fill server 130 can provide the aggregated content information to the premise devices 116B. In one embodiment, the broadband in-fill server 130 can provide an electronic programming guide (EPG) to the premises devices 106 listing program content and scheduling information for broadband content.

In one or more embodiments, the broadband in-fill server 130 can receive a request for content from one of the premises devices 116C. For example, a user of the premises device 116C can make a selection of a content item from an EPG. In another example, the user of the premises device 116B can select content from an Internet-based site or application, such as a streaming content site. The content can be any broadband data content, including media programs, music, textual and/or graphical data, online video game sessions, and the like.

In one or more embodiments, the broadband in-fill server 130 can determine how to provide the requested content (data) using the broadband bandwidth that the broadband in-fill server 130 has aggregated from the unused capacity of the LTE servers 117A-D to which it is attached. The broadband in-fill server 130 can compare the bandwidth requirements for content that it is currently providing and content that it has been requested to provide to its available broadband bandwidth. In one embodiment, the broadband in-fill server 130 can use an Assignment and Delivery Policy (ADP) to determine how best to fulfill the content requests while maintaining Quality of Service (QoS) for premises customers and while not deteriorating QoS for mobile subscribers. For example, the ADP can direct the broadband in-fill server 130 to give highest bandwidth priority to fulfilling requests for live content, while making requests for content that will be recorded for subsequent playback at a premises device 106 a lower bandwidth priority. In another embodiment, the ADP may rely on a fall-over policy, whereby a premises device, such as mobile communication device 116C, which has capability for accessing services from an LTE server 135B via its own cellular RF signals, can use this capability to augment the broadband services of the broadband in-fill server 130 if the broadband bandwidth that is available to the broadband in-fill server 130 is not sufficiently large enough to handle all of the requested content.

In one or more embodiments, the broadband in-fill server 130 can track the unused data capacity information from the attached LTE servers 135A, B, and D, to predict the broadband bandwidth in light of historic patterns of unused data capacity. For example, the broadband in-fill server 130 can recognize that the unused data capacity exhibits peaks during pre-dawn hours and valleys during afternoons. The broadband in-fill server 130 can use this information predict the available broadband bandwidth and to assign the broadband bandwidth to content/data tasks accordingly. In one embodiment, the broadband in-fill server 130 may preload certain content from the broadband content server 160. This can be an effective strategy for improving QoS at the premises devices, where the particular content is highly likely to be requested (e.g., a premier episode of a series). If this content is made available to the broadband in-fill server 130 for preloading, then the broadband in-fill server 130 can schedule the task during off-peak usage of the LTE servers 135A-D, when the broadband bandwidth available to the broadband in-fill server 130 is highest.

In one or more embodiments, where a broadband in-fill server 130 has downloaded and stored a content item for subsequent retrieval, the broadband in-fill server 130 can make the stored content item available to premises devices 116B. In another embodiment, the broadband in-fill server 130 can make content available to other broadband in-fill servers. For example, a first broadband in-fill server 130 in the system 100 can communicate with a second broadband in-fill server 130 via the mobility network. If the first broadband in-fill server 130 receives a request for a particular content item, then the first broadband in-fill server 130 can send a request to the second broadband in-fill server 130 inquiring as to whether the second broadband in-fill server 130 has a stored copy of the content. If the second broadband in-fill server 130 has a stored copy (or access to the stored copy), then the second broadband in-fill server 130 can send the stored copy to the first broadband in-fill server 130 and thereby reduce loading on the LTE system. In one embodiment, the broadband in-fill server 130 can determine if the content/data item is stored locally with the broadband in-fill server 130 or within the group of premises devices 106. The broadband in-fill server 130 can then retrieve the content/data item from the local source.

In one or more embodiments, the broadband in-fill server 130 can track the portions of the broadband bandwidth that are provided by each LTE server 135A-D. In one embodiment, as the broadband in-fill server 130 assigns portions of the broadband bandwidth to delivering content/data to the premises devices, the broadband in-fill server 130 can, where possible, make assignments that will allow a single LTE server 117B to deliver an entire content/data item. For example, if LTE server 117B has available, unused bandwidth to deliver an entire television program to the broadband in-fill server 130, then the broadband in-fill server 130 can assign the downloading task entirely to this LTE server 117B. In another embodiment, the broadband in-fill server 130 can either determine that known of the LTE servers 117A-D has enough available and, yet, unassigned bandwidth to fulfill an entire content/data request or can determine that the needs of the system 100 are better served by distributing the task to multiple LTE servers 117A-D. In this case, the broadband in-fill server 130 can split the delivery of a content/data item between multiple LTE servers 117A-D.

In one or more embodiment, where the broadband in-fill server 130 can assign or map portions of a content/data item for delivery by different LTE servers 117A-D, then the broadband in-fill server 130 can track the delivery of these portions during the delivery process. In one or more embodiments, the broadband in-fill server 130 can request multiple physical resource blocks (PRBs). For example, the broadband in-fill server 130 can request first PRBs from a first LTE server 117A and second PRBs from a second LTE server 117B. The size of the PRBs can depend on the available unused capacity of each LTE server 117A and 117B. The broadband in-fill server 130 can request the PRBs at the same time or sequentially. When the PRBs are received from the multiple LTE servers 117A-B, the broadband in-fill server 130 can parse the content/data and can recreate, store, and/or stream the content/data item.

In one or more embodiments, the broadband in-fill server 130 can serve a single premises, as shown, where the broadband in-fill server 130 coupled directly to one or more gateway devices 104 for serving a group of premises devices. The broadband in-fill server 130 can be couple to the premises via a wired or wireless communication link. In this case, the broadband in-fill server can serve as a full function device that interfaces to the LTE servers 135A-D, aggregates and assigns broadband bandwidth, and delivers content to the premises gateway device 104.

Figure 2:
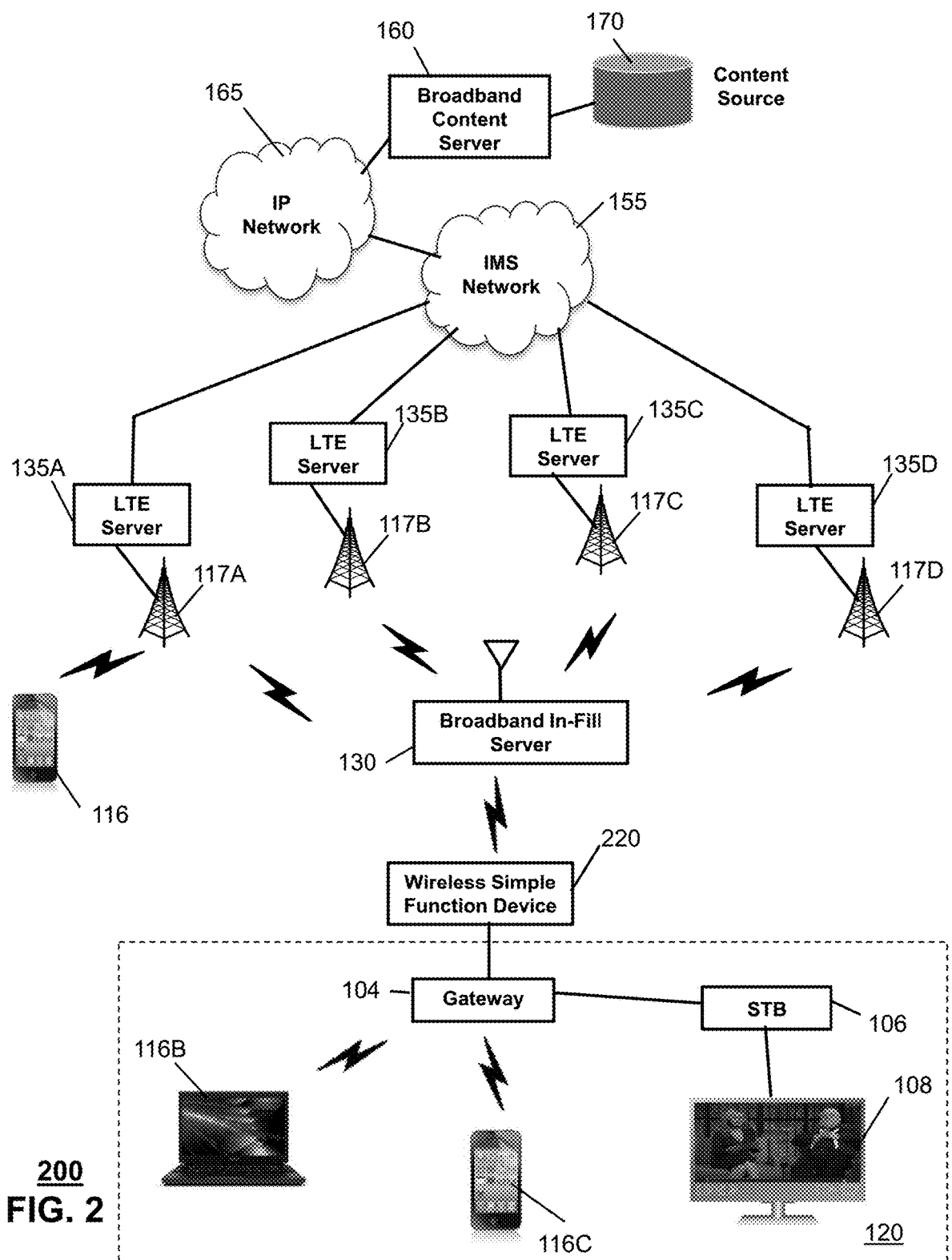
FIG. 2 depicts an illustrative embodiment of a system that can be utilized for providing content via a wireless communication network using a broadband in-fill server and a simple function device.

FIG. 2 depicts an illustrative embodiment of a system 200 where the broadband in-fill server 130 is combined with a simple function device 220. In one or more embodiments, the broadband in-fill server 130 can serve as an enterprise server that interfaces to the LTE servers 135A-D, aggregates and assigns broadband bandwidth, and then delivers content to one or more of the simple function devices 220. The simple function device 220 can connect to the broadband in-fill server 130 constantly or periodically and can buffer and aggregate multiple data streams from the "enterprise" broadband in-fill server 130. The simple function device 220 can pass the content via one or multiple broadband streams to a residential gateway device 104 at a premises. The communication from simple function device 220 to the gateway device can be via wireless (e.g., WiFi, Bluetooth) or wireline (e.g., copper coax or Ethernet CAT cable). By including the simple function device 220 layer, the broadband in-fill server 130 can be extended to service multiple premises and/or large building and/or campuses.

Figure 3:
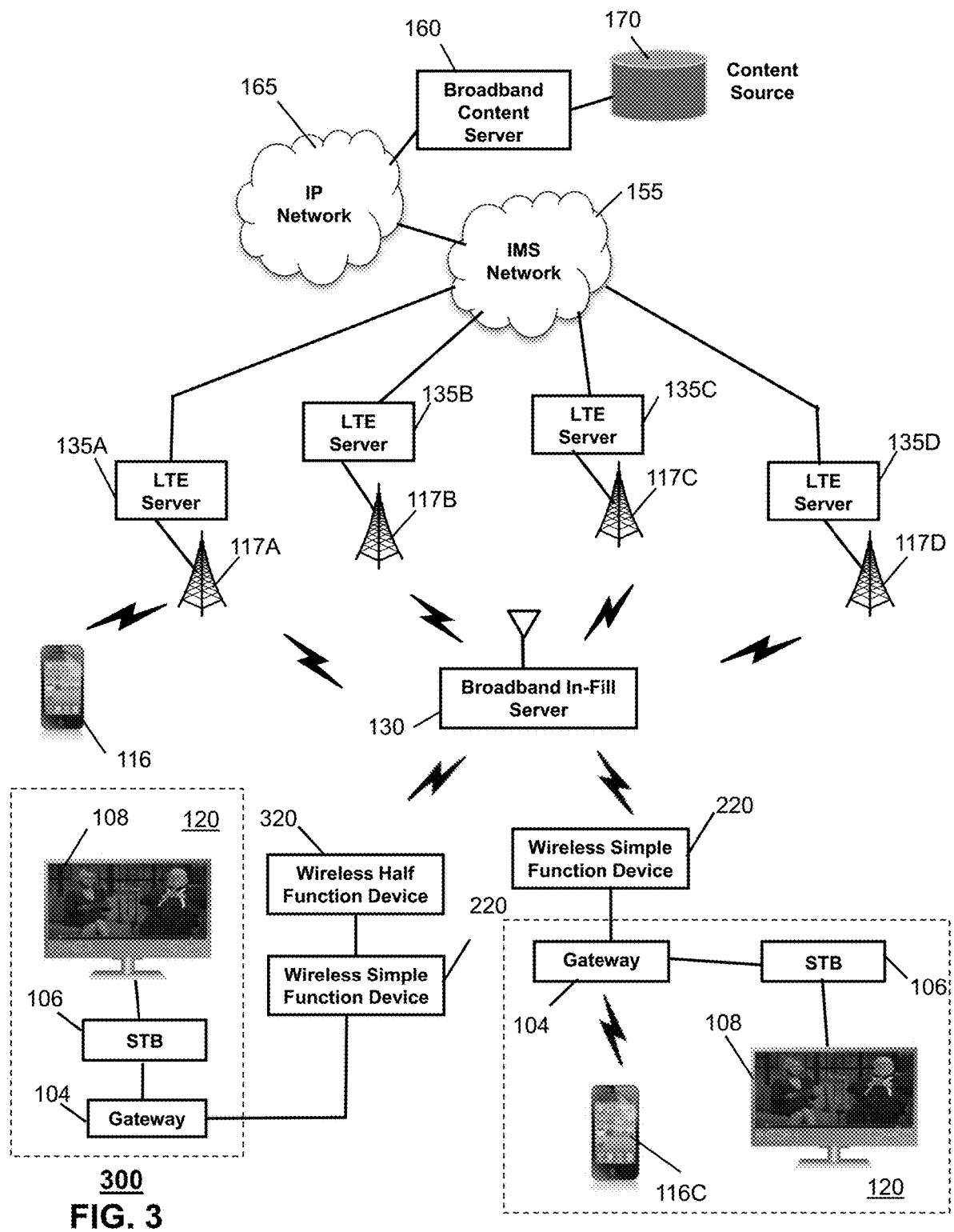
FIG. 3 depicts an illustrative embodiment of a system that can be utilized for providing content via a wireless communication network using a broadband in-fill server and a half function device.

FIG. 3 depicts an illustrative embodiment of a system 200 where the broadband in-fill server 130 is further combined with a half function device 320. In one or more embodiments, the broadband in-fill server 130 can serve as an enterprise server, that interfaces to the LTE servers 135A-D, aggregates and assigns broadband bandwidth, and then delivers content to one or more half function devices 320. The half function device 320 can connect to the broadband in-fill server 130 constantly or periodically and can buffer and aggregate multiple data streams from the "enterprise" broadband in-fill server 130. can buffer and aggregate multiple data streams from the "enterprise" broadband in-fill server 130. The half function device 320 can pass the content via one or multiple broadband streams to a residential gateway device 104 at a premises either directly or indirectly via a simple function device 220. The communication from half function device 320 to the simple function device 220 and/or the gateway device 104 can be via wireless (e.g., WiFi, Bluetooth) or wireline (e.g., copper coax or Ethernet CAT cable). By including the half function device 320 layer, the broadband in-fill server 130 can be extended to service complex premises architectures.

Figure 4:
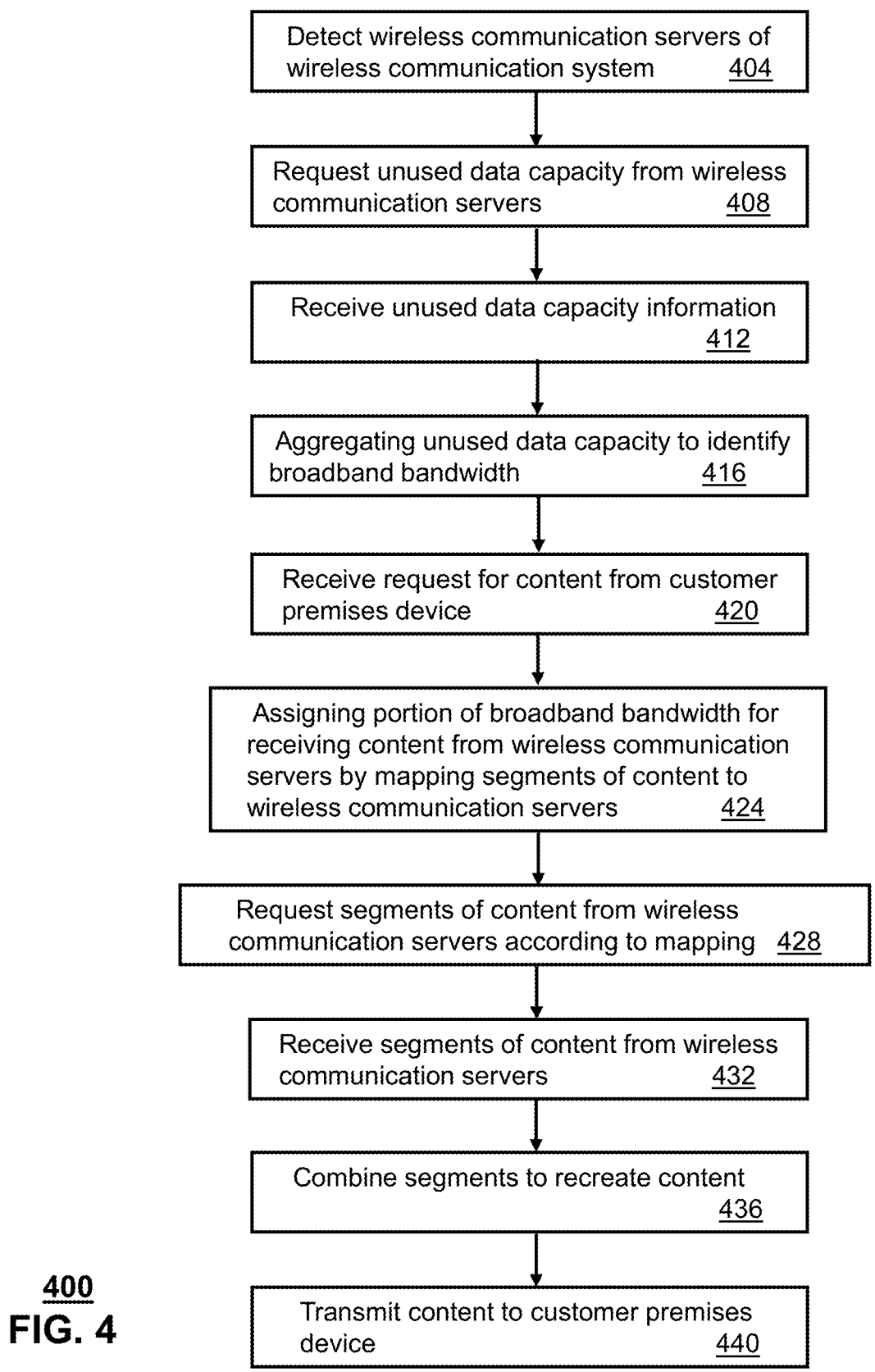
FIG. 4 depicts an illustrative embodiment of a method used in portions of the systems described in FIGS. 1-3.

FIG. 4 depicts an illustrative embodiment of a method used by systems 100-300 for providing content to customer premises devices using a broadband in-fill server 130 and a wireless communication system. In one or more embodiments, in step 404, a broadband in-fill server 130 can detect wireless communication servers 135A-D of a wireless communication system 100. The broadband in-fill server 130 can detect RF signals from one or more of the cellular base stations 117A-D. The broadband in-fill server 130 can initiate connections to multiple wireless communication servers 135A-D with which it is receiving sufficiently strong RF signal power.

In step 408, the broadband in-fill server 130 can request information from the wireless communication servers 135A, B, and D with which the broadband in-fill server 130 is in communication. In particular, the broadband in-fill server 130 can request information regarding unused data capacity for each of the LTE servers 135A, B, and D. In step 412, the broadband in-fill server 130 can, in turn, receive the unused data capacity information from the LTE servers 135A, B, and D.

In step 416, the can aggregate, or combine, the unused capacity from these LTE servers to identify broadband bandwidth. The broadband in-fill server 130 can aggregate this unused radio capacity of multiple neighboring LTE servers 135A, B, and D and make the consolidated bandwidth available to the gateway device 104 for the distribution of multimedia hi-speed services, without significantly impacting mobile users sharing the same sites. Broadband bandwidth is identified by aggregating small amounts of data from multiple LTE servers 135A, B, and D so as to minimally impact the LTE network.

In step 420, the broadband in-fill server 130 can receive a request for content from one of the premises devices 116C. The premises device 116C can make a selection of a content item from an EPG. A user of the premises device 116B can select content from an Internet-based site or application, such as a streaming content site. In step 424, the broadband in-fill server 130 can assign portions of the broadband bandwidth for receiving the content from the wireless communication servers. The broadband in-fill server 130 can assign or map portions of a content/data item for delivery by different LTE servers 117A-D, then the broadband in-fill server 130 can track the delivery of these portions during the delivery process.

In step 428, the broadband in-fill server 130 can request segments of content from the wireless communication servers according to the mapping. The broadband in-fill server 130 can request first PRBs from a first LTE server 117A and second PRBs from a second LTE server 117B. The size of the PRBs can depend on the available unused capacity of each LTE server 117A and 117B. The broadband in-fill server 130 can request the PRBs at the same time or sequentially. In step 432, in turn, the broadband in-fill server 130 can receive the segments of content from the wireless communication servers. The broadband in-fill server 130 can request the PRBs at the same time or sequentially. In step 436, the broadband in-fill server 130 can combine the received segments to recreate the content and, in turn, transmit the content to a customer premises device. When the PRBs are received from the multiple LTE servers 117A-B, the broadband in-fill server 130 can parse the content/data and can recreate, store, and/or stream the content/data item.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
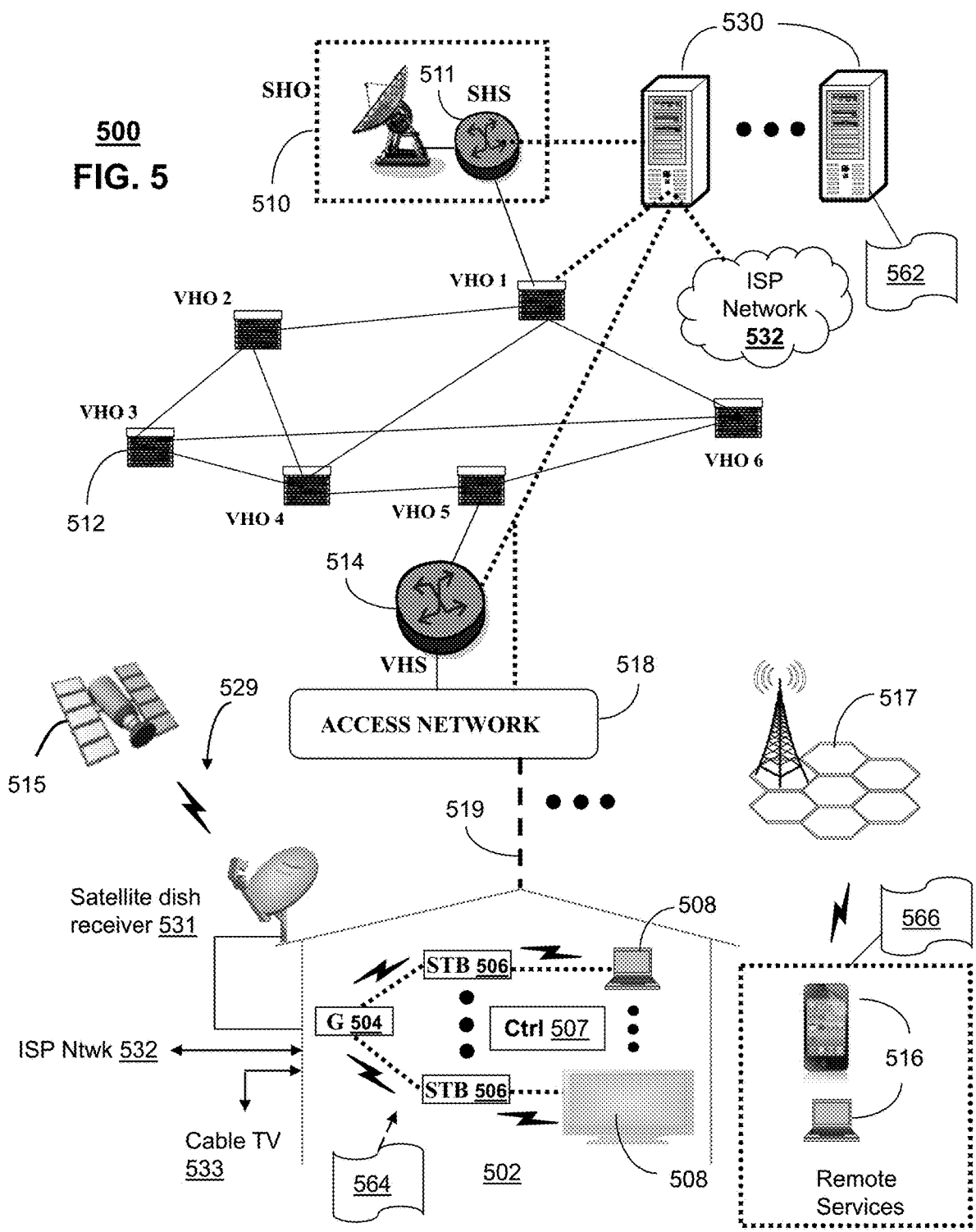
FIGS. 5-6 depict illustrative embodiments of communication systems that provide media services for use by the communication systems of FIGS. 1-3.

FIG. 5 depicts an illustrative embodiment of a first communication system 500 for delivering media content. The communication system 500 can represent an Internet Protocol Television (IPTV) media system. Communication system 500 can be overlaid or operably coupled with systems 100-300 of FIGS. 1-3, as another representative embodiment of communication system 500. For instance, one or more devices illustrated in the communication system 500 of FIG. 5 for aggregating unused data capacity of wireless communication servers and assigning portions of the resulting broadband bandwidth for delivery of content to premises devices.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a broadband in-fill server 530. The broadband in-fill server 530 can use computing and communication technology to perform function 562, which can include among other things, the content delivery techniques described by method 400 of FIG. 4. For instance, function 56X2 of server 530 can be similar to the functions described for server 130 of FIGS. 1-3 in accordance with method 400 of FIG. 4. The media processors 506 and wireless communication devices 516 can be provisioned with software functions 564 and 566, respectively, to utilize the services of broadband in-fill server 530. For instance, functions 564 and 566 of media processors 506 and wireless communication devices 516 can be similar to the functions described for the media processor device 106 and the mobile communication device 116 of FIGS. 1-3 in accordance with method 400 of FIG. 4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
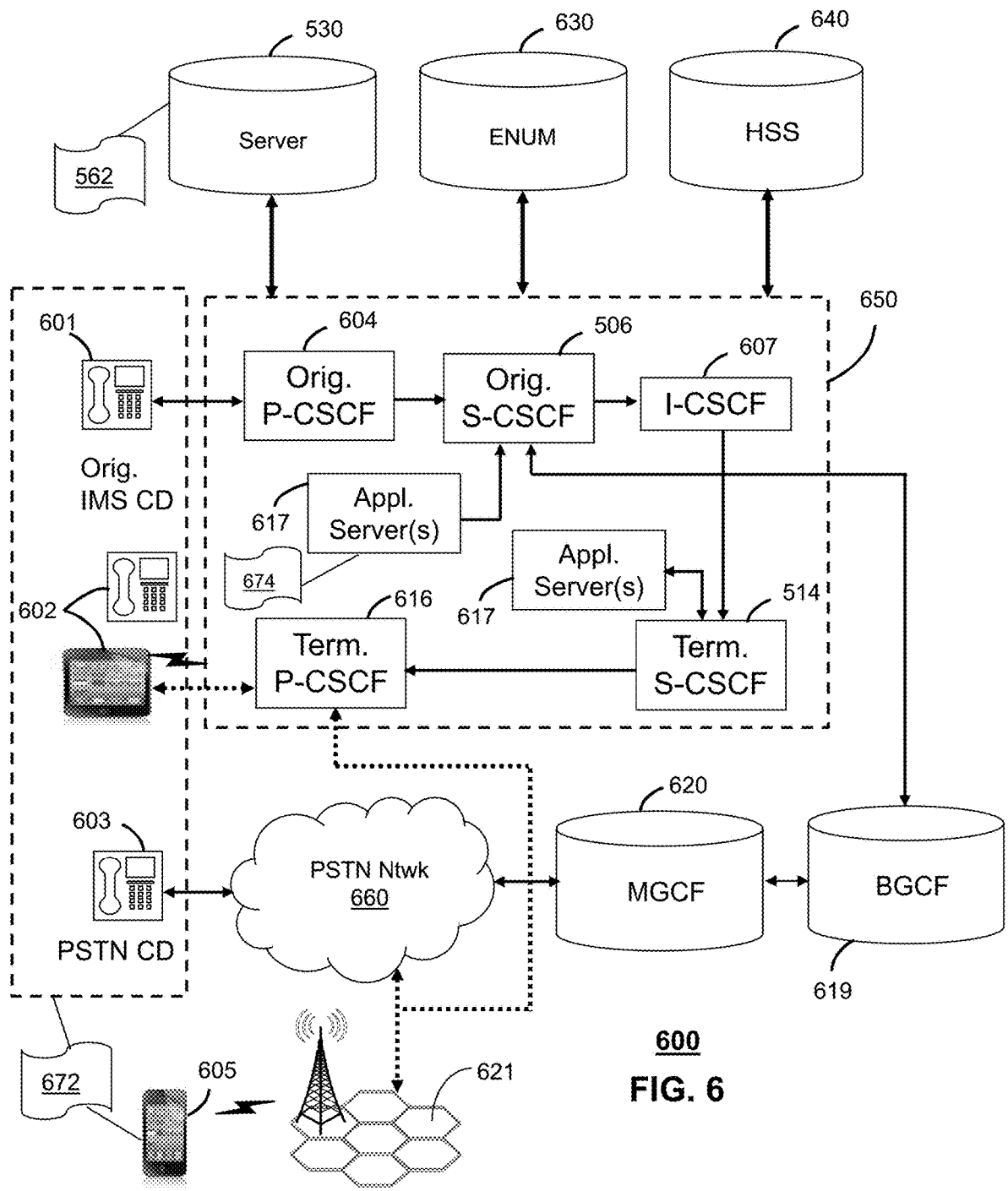

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with systems 100-300 of FIGS. 1-3 and communication system 600 as another representative embodiment of communication system 600 for aggregating unused data capacity of wireless communication servers and assigning portions of the resulting broadband bandwidth for delivery of content to premises devices.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The broadband in-fill server 530 of FIG. 5 can be operably coupled to communication system 600 for purposes similar to those described above. Broadband in-fill server 130 can perform function 562 and thereby provide content distribution services to the CDs 601, 602, 603 and 605 of FIG. 6 similar to the functions described for server 130 of FIGS. 1-3 in accordance with method 400 of FIG. 4. CDs 601, 602, 603 and 605, which can be adapted with software to perform function 672 to utilize the services of the broadband in-fill server 530 similar to the functions described for mobile communication devices 116 and 116C of FIGS. 1-3 in accordance with method 400 of FIG. 4. Broadband in-fill server 530 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
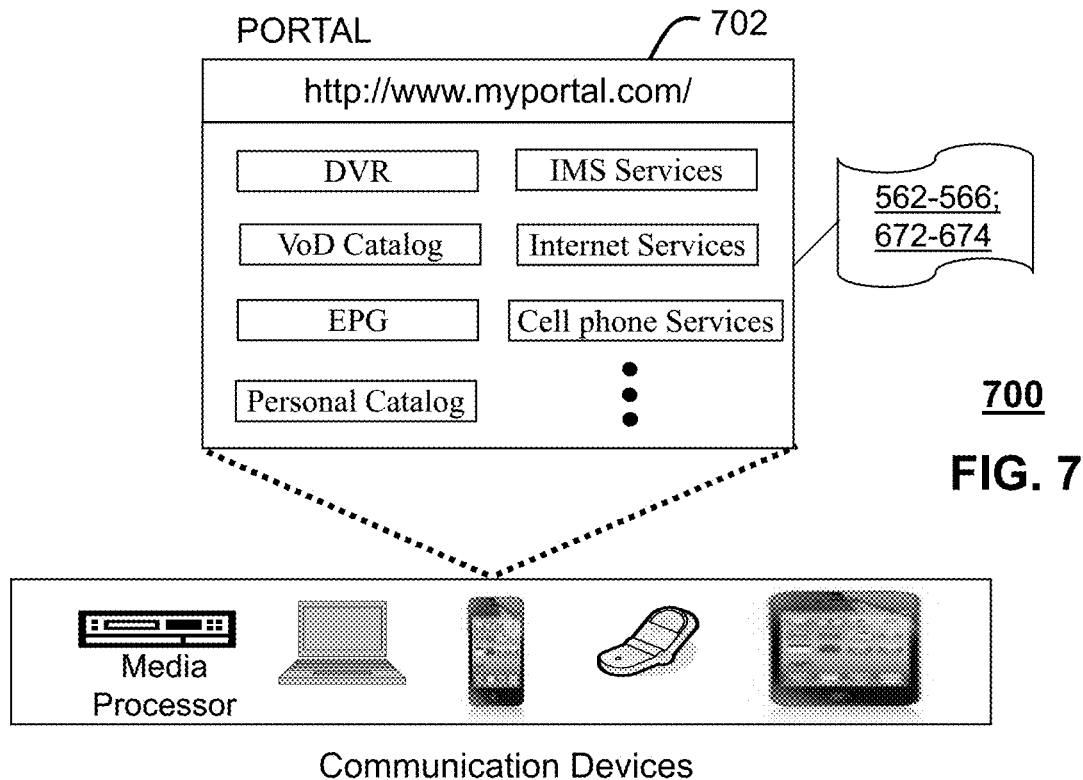
FIG. 7 depicts an illustrative embodiment of a web portal for interacting with the communication systems of FIGS. 1-3 and 5-6.

FIG. 7 depicts an illustrative embodiment of a web portal 702 of a communication system 700. Communication system 700 can be overlaid or operably coupled with systems 100-300 of FIGS. 1-3, communication system 500, and/or communication system 600 as another representative embodiment of systems 100-300 of FIGS. 1-3, communication system 500, and/or communication system 600. The web portal 702 can be used for managing services of systems 100-300 of FIGS. 1-3 and communication systems 500-600. A web page of the web portal 702 can be accessed by a Uniform Resource Locator (URL) with an Internet browser using an Internet-capable communication device such as those described in FIGS. 1-3 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-676 to adapt these applications as may be desired by subscribers and/or service providers of systems 100-300 of FIGS. 1-3, and communication systems 500-600. For instance, users of the services provided by server 130 or server 530 can log into their on-line accounts and provision the server 130 or server 530 with a user profiles and/or to provide contact information to the server to enable it to communication with devices described in FIGS. 1-3 and 5-6, and so on. Service providers can log onto an administrator account to provision, monitor and/or maintain the systems 100-300 of FIGS. 1-3 or server 130 or server 530.

Figure 8:
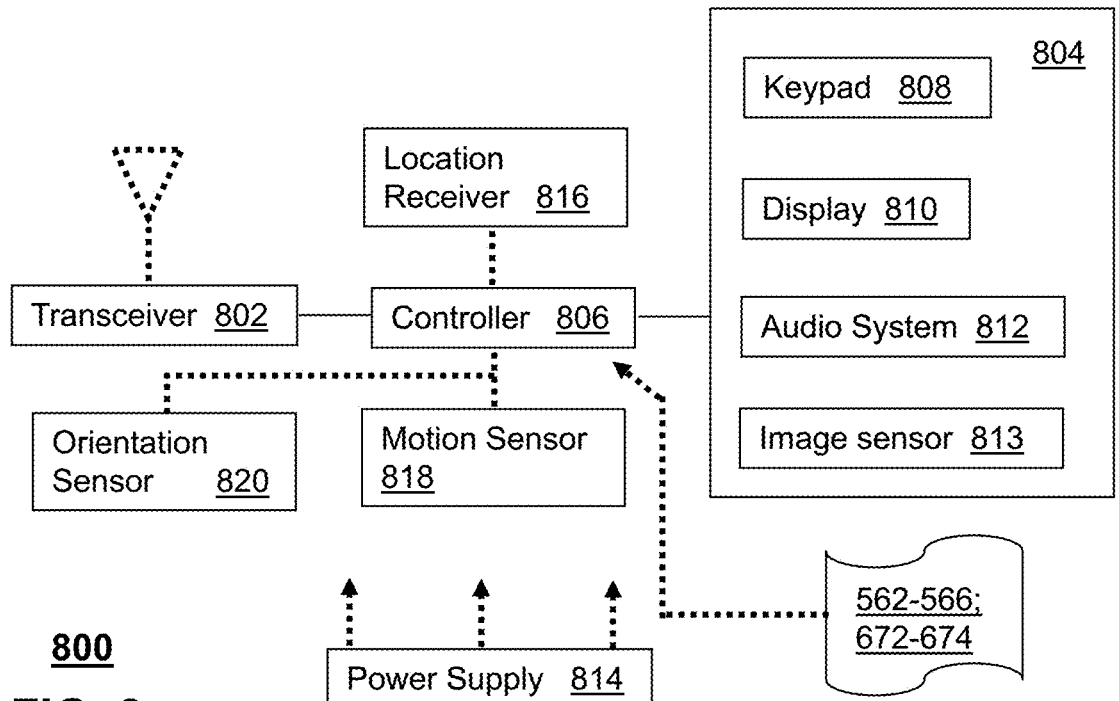
FIG. 8 depicts an illustrative embodiment of a communication device.
Figure 9:
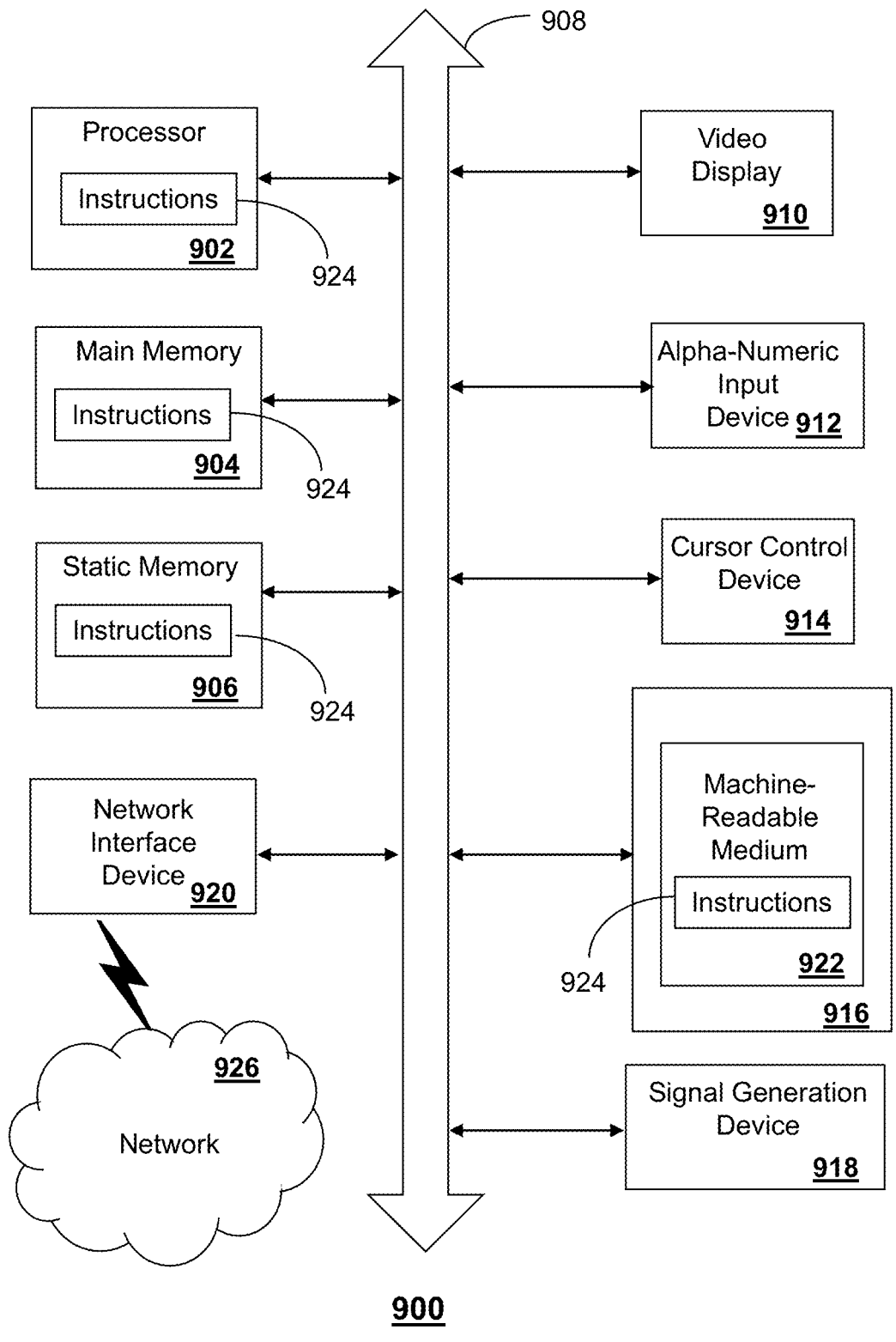
FIG. 9 is a diagrammatic representation of a machine in the form of a computer system within which a set of instructions, when executed, may cause the machine to perform any one or more of the methods described herein.

FIG. 8 depicts an illustrative embodiment of a communication device 800. Communication device 800 can serve in whole or in part as an illustrative embodiment of the devices depicted in FIGS. 1-3, and FIGS. 4-5 and can be configured to perform portions of method 400 of FIG. 4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1-3, the broadband in-fill server 130, the gateway device 104, the components of the LTE servers 135A-D, the media processor device 106, the media devices 108, the mobile communication devices 516 of FIG. 4, as well as the IMS CDs 601-602 and PSTN CDs 603-605 of FIG. 6. It will be appreciated that the communication device 800 can also represent other devices that can operate in systems of FIGS. 1-3, communication systems 500-600 of FIGS. 5-6 such as a gaming console and a media player. In addition, the controller 806 can be adapted in various embodiments to perform the functions 562-566 and 672-674, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the broadband in-fill server 130, the gateway device 104, and/or the wireless communication servers 135A-D and other devices of FIGS. 1-3 and 5-6] In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a processing system including a processor; and
a memory that stores executable instructions that, when executed by the processor, facilitate performance of operations, the operations comprising:
determining, based on unused data capacity information that is obtained via monitoring of a plurality of servers of a wireless communication system, a broadband bandwidth and a resource usage pattern;
mapping first segments of first content for delivery by a first group of the plurality of servers according to a first portion of the broadband bandwidth;
based upon receiving the first segments from the first group of the plurality of servers according to the mapping of the first segments, transmitting a first content stream that includes the first segments to a customer premises device;
mapping second segments of second content for delivery by a second group of the plurality of servers according to a second portion of the broadband bandwidth;
determining a time period for receiving the second segments of the second content from the second group of the plurality of servers according to the resource usage pattern; and
based upon receiving the second segments from the second group of the plurality of servers according to the time period and the mapping of the second segments, storing the second segments for subsequent transmission to the customer premises device.

2. The server of claim 1, wherein the second segments are stored at the memory, and wherein the operations further comprise determining whether third content requested by the customer premises device is available in local storage or in a server device different from the plurality of servers, and obtaining the third content from the local storage or the server device responsive to determining that the third content is available in the local storage or the server device.

3. The server of claim 1, wherein the plurality of servers comprises a first wireless communication server and a second wireless communication server.

4. The server of claim 3, wherein the operations further comprise requesting first physical resource blocks from the first wireless communication server via a first cellular base station and second physical resource blocks from the second wireless communication server via a second cellular base station.

5. The server of claim 4, wherein the first segments of the first content are received via the first physical resource blocks and the second physical resource blocks.

6. The server of claim 1, wherein the operations further comprise combining the first segments to derive the first content stream.

7. The server of claim 1, wherein the operations further comprise connecting to the customer premises device via a premises gateway device.

8. The server of claim 1, wherein the operations further comprise:
receiving content availability information from the plurality of servers;
aggregating the content availability information from the plurality of servers to generate a list of available content, wherein the list of available content comprises an electronic programming guide; and
transmitting the list of available content to the customer premises device.

9. A non-transitory machine-readable storage medium comprising executable instructions that, when executed by a processing system including a processor, facilitate performance of operations, the operations comprising:
determining, based on unused data capacity information that is associated with a plurality of servers of a wireless communication system, a broadband bandwidth and a resource usage pattern;
performing a first mapping of a first plurality of segments of first content for delivery by one or more first servers of the plurality of servers, wherein the first mapping is according to a first portion of the broadband bandwidth;
based upon receiving the first plurality of segments from the one or more first servers according to the first mapping, transmitting a first content stream, including the first plurality of segments, to a customer premises device;
performing a second mapping of a second plurality of segments of second content for delivery by one or more second servers of the plurality of servers, wherein the second mapping is according to a second portion of the broadband bandwidth;
determining a time period for receiving the second plurality of segments of the second content from the one or more second servers according to the resource usage pattern; and
based upon receiving the second plurality of segments from the one or more second servers according to the time period and the second mapping, storing, for later transmission to the customer premises device, the second plurality of segments.

10. The non-transitory machine-readable storage medium of claim 9, wherein the unused data capacity information is obtained via monitoring of data capacity that is retained by the plurality of servers, and wherein the monitoring comprises requesting capacity information.

11. The non-transitory machine-readable storage medium of claim 10, wherein the requesting the capacity information comprises requesting the capacity information from one or more of the plurality of servers of the wireless communication system.

12. The non-transitory machine-readable storage medium of claim 11, wherein the capacity information is requested periodically.

13. The non-transitory machine-readable storage medium of claim 9, wherein the operations further comprise:
requesting content availability information from one or more of the plurality of servers of the wireless communication system;
receiving the content availability information from the one or more of the plurality of servers of the wireless communication system;
aggregating the content availability information from the one or more of the plurality of servers of the wireless communication system to generate a list of available content; and
transmitting the list of available content to the customer premises device.

14. The non-transitory machine-readable storage medium of claim 9, wherein the operations further comprise requesting the first plurality of segments from the one or more first servers and determining whether the broadband bandwidth is sufficiently large for downloading the first plurality of segments that are requested, and wherein the receiving the first plurality of segments is conditioned upon the broadband bandwidth being sufficiently large for the downloading of the first plurality of segments.

15. A method, comprising:
- determining, by a processing system comprising a processor and according to unused data capacity information that is based on monitoring data capacity retained by wireless communication servers, a broadband bandwidth and a resource usage pattern;
- assigning, by the processing system, a first portion of the broadband bandwidth for receiving first content from the wireless communication servers, wherein the assigning of the first portion of the broadband bandwidth causes a first mapping of the first content for delivery by a first portion of the wireless communication servers according to the first portion of the broadband bandwidth;
- based upon receipt of the first content from the wireless communication servers according to the first mapping, transmitting, by the processing system, the first content to a customer premises device;
- assigning, by the processing system, a second portion of the broadband bandwidth for receiving second content from the wireless communication servers, wherein the assigning of the second portion of the broadband bandwidth causes a second mapping of the second content for delivery by a second portion of the wireless communication servers according to the second portion of the broadband bandwidth;
- determining, by the processing system, a time period for receiving the second content from the second portion of the wireless communication servers according to the resource usage pattern; and
- based upon receipt of the second content from the second portion of the wireless communication servers according to the time period and the second mapping, storing, by the processing system, the second content for subsequent transmission to the customer premises device.

16. The method of claim 15, further comprising receiving, by the processing system, a request for the first content from the customer premises device.

17. The method of claim 15, further comprising requesting, by the processing system, the first content from the wireless communication servers according to the first mapping.

18. The method of claim 15, further comprising connecting, by the processing system, to the customer premises device via a premises gateway device.

19. The method of claim 15, wherein the first mapping comprises a mapping of segments of the first content for delivery by the wireless communication servers.

20. The method of claim 19, further comprising combining, by the processing system, the segments of the first content that are received to recreate the first content.

* * * * *